Nov. 27, 1934.  J. E. SHEPHERD  1,982,325
APPARATUS FOR STEAM CLEANING AND GREASING OF BEARINGS
Filed Oct. 16, 1929  2 Sheets-Sheet 1
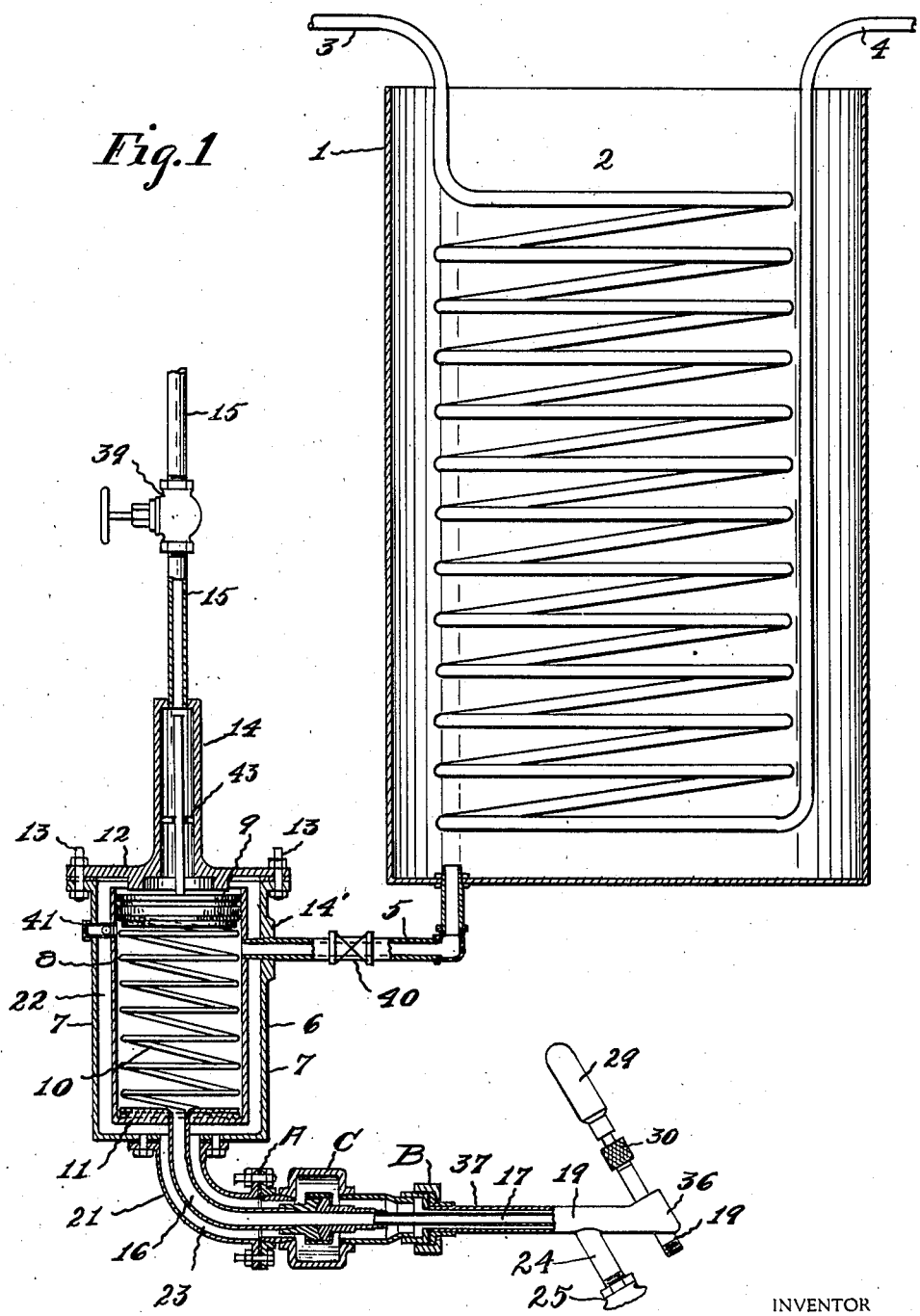
INVENTOR
John E. Shepherd,
BY
ATTORNEY

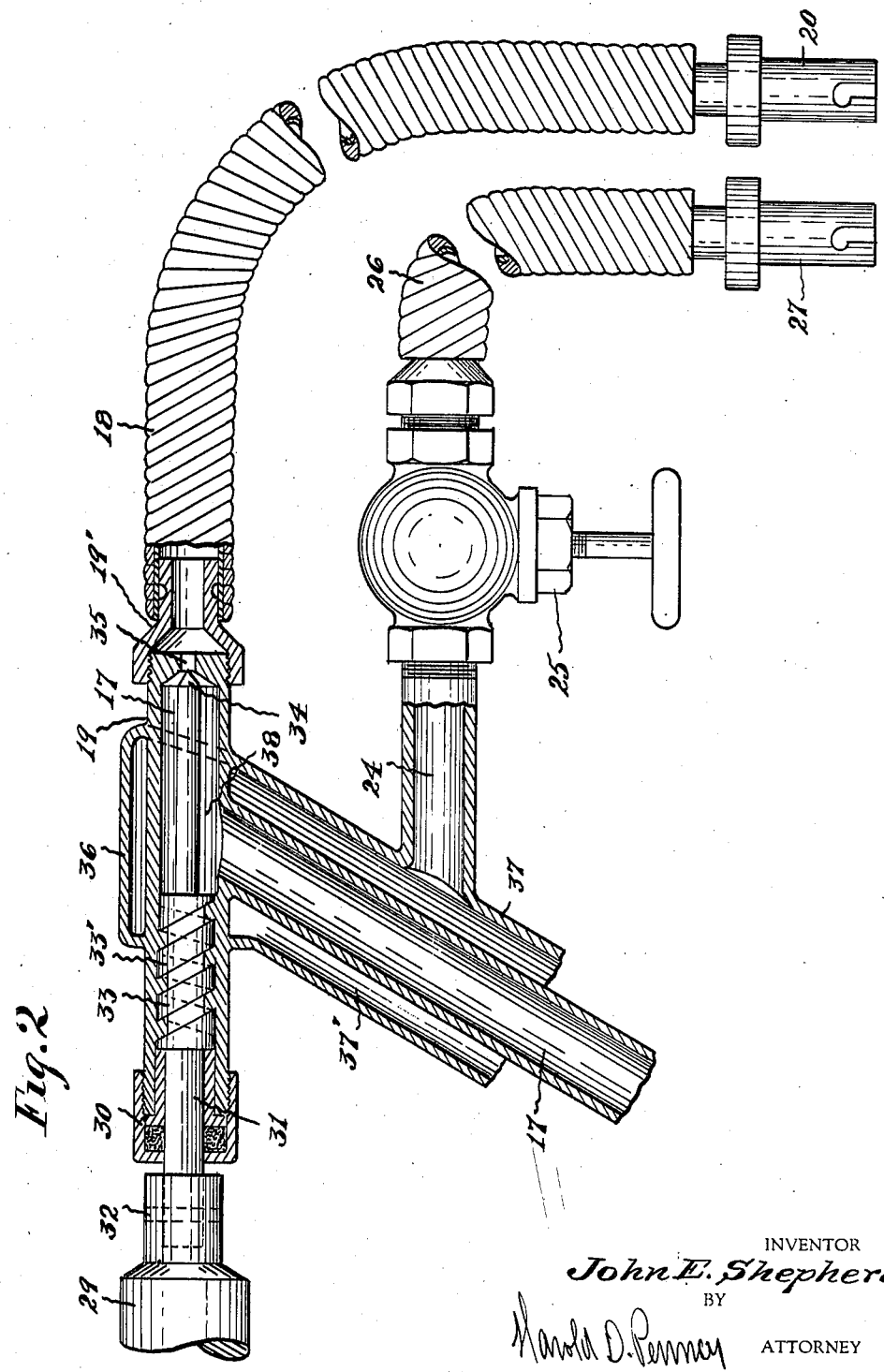

Patented Nov. 27, 1934

1,982,325

UNITED STATES PATENT OFFICE

1,982,325

APPARATUS FOR STEAM CLEANING AND GREASING OF BEARINGS

John E. Shepherd, Charlottesville, Va., assignor to National Cold Steam Company, Charlottesville, Va., a corporation of Delaware Application October 16, 1929, Serial No. 400,054

25 Claims. (Cl. 184—1)

My present invention relates to an improvement in apparatus for the greasing of bearings and more especially the greasing of spring bearings, knuckles and the like in automobiles, and analogous uses.

My new invention contemplates an improvement over the present known systems of pressure lubrication, first, by permitting the use of a much harder grease, mixed, in some instances with flake or flocculent graphite, than has been heretofore possible with such known systems and, secondly, the utilization of heat to soften such hard greases to a sufficiently plastic state as to permit the said grease to be readily introduced into the bearings at reasonable pressures, and thirdly, the provision of means in my present system whereby such joints as are to be lubricated may be thoroughly steam cleaned, and heated so as to encompass the previous removal of all old grease and caked dirt in such joints or bearings prior to the introduction of a new charge.

The main advantage in my system is that I am enabled to utilize steam, through a specially designed apparatus, at suitable pressures, to clean the joints of old grease, to melt the hard new grease for the introduction into bearings, knuckles, etc., and to put pressure upon said softened grease to force it into the bearings. Thus, I have found joints so lubricated are cleaned of all dirt and grit and are packed with a grease sufficiently plastic, upon introduction, through the use of heat, thereafter to harden in the joint and bearings upon cooling, and to provide lubrication that withstands the tendency to extrude and drop away, and in this respect is better than the softer greases heretofore used in cold state, and to thoroughly protect such bearings when lubricated, as will hereinafter be outlined.

In the drawings:

Fig. 1 is a sectional view of my device showing the main components thereof, and Fig. 2 is a partially sectional enlarged view of the nozzle means showing the steam and greasing connections and controls.

In my system I utilize any source of steam at any suitable pressure, this being obtained from a boiler, not shown, and from this source of steam, heat is brought to a grease container 1 in which is located a grease softening steam coil 2, the ends 3 and 4 of which are connected to the boiler supply whereby to keep a constant circulation of steam within the coil 2, as desired.

The container 1 may be filled with a hard packing grease of a paraffin or parowax base preferably mixed with a suitable grade of finely divided graphite, which, when in a cold state, is normally fairly hard, and in non-heated state is virtually non-plastic and therefore not readily flowable except under extremely high pressures.

By the introduction of steam in the coil 2, the hard grease within the container, not shown, is reduced to a fluid or plastic state and is withdrawn as required from the container 1 by means of a duct or pipe connection, generally denoted as 5. This duct connection, having one end in communication with the bottom of the container, leads at its other end, as shown, into the heated grease pressure applying means generally denoted by 6, and this will now be described.

The pressure applying means comprises an outer casing or steam jacket 7, through a boss 14' of which said duct 5 passes, and in the interior of which is suitably mounted an inner piston chamber 8, the upper end of which is open and receivably mounts therein for reciprocation, a piston element or head 9, having a guiding stem as shown, operating in a spider guide ring 43 as shown in Fig. 1.

Below the piston 9 and within the cylinder 8 is a piston returning spring 10, the bottom thereof resting upon the closed bottom 11 of the cylinder 8 and supportably and resiliently holding the piston 9 upward.

The outer casing 7 is provided with a steam-tight cylinder head 12 and is held in operative position to the flanges of the casing 7 by means of bolts and nuts 13. The said cylinder head 12 is also provided with a tubular extension 14 in which is fixedly mounted the piston stem guide 43, extension 14 having a valved steam pipe 15, said steam pipe 15 being connected to the source of steam as previously described, but not shown.

The lower closed end of the piston cylinder 8 is provided with a grease conducting exit pipe 16 which is in turn connected, through various jointed connections A, B and C, to an extension 17 thereof, whereby the grease is conducted to a flexible tubular extension 18, Fig. 2, one end of which tube is suitably attached to the nozzle head 19, as at 19', Fig. 2, and the other end of which carries thereon the usual bayonet grease cup attachment 20 for quickly and effectively connecting the flexible connection to the usual interlocking type of grease nipple, in the usual manner.

The foregoing described grease conducting connection is surrounded by an outer casing or piping 21 thereby forming a steam chamber thereabout so that steam from the duct 15 when it enters into the casing 7 will flow about the piston cylinder 8, in the steam space 22 formed therein, and thence through the steam space 23 formed about the duct 16, and thence is conducted through a secondary duct 24 which is controlled by a valve 25, the other end of which valve has connected to it a flexible connection 26 which also has on its outer end a bayonet steam connector 27, as previously described for the grease connection 18.

The continuation of the surrounding steam chamber or ducts 21—22 and 23 as shown in Fig. 1 is made up of various suitable removable pipe connections A, B, and C whereby to admit of attachment and detachment of the nozzle 19 for cleansing and replacement, and the outer construction of the connections A, B, and C, Fig. 1, are suitably contoured to form a steam chamber about the grease conduits whereby the grease may be kept warm or plastic or fluid until it is emitted from the nozzle 19 into the bearings.

For manipulating the grease nozzle as in Fig. 2, which shows an enlarged sectional view of the said nozzle, there is disclosed a handle 29, Figs. 1 and 2, which passes through a stuffing box connection 30, and the inner end of the handle is provided with a rigidly affixed valve needle 31, one end thereof being suitably pinned or affixed to the handle 29 by means of a dowel 32, and is provided at its intermediate portion with a thread 33, to engage with the associate threaded bore 33', the outer end thereof being extended into a stem form and having a tapering valve closing end 34 thereon which cooperates with a port 35 in the grease duct 17, so that as desired, the valve handle 29 may be rotated to close or open the port 35 to permit the passage of grease thereby and into the flexible connector 18.

At about the valve end 34 the nozzle is provided with a steam extension 36 or shell which surrounds the needle valve 34, steam being admitted through the passage 37' which is an extension of the duct 21 so that, during use, steam at all times is present about the valve to prevent hardening and caking of the hard grease and to keep it fluid. Steam, however, does not enter the needle valve chamber as it is blocked therefrom but grease is admitted through the port 17, Fig. 2, into the needle valve chamber, generally denoted by 38, there to flow through the valve port 35 to 18, as described.

From the outer steam casing or duct 37 extends the steam duct 24 controlled by the valve 25, whereby steam may be introduced into the joint about to be greased thereby to melt out and thoroughly clean the said joints or bearings prior to greasing. This valve 25 also serves for exhaust purposes, to ensure movement of steam from the inlet valve 39 along the heating passages.

In the operation of my device the bayonet steam connector 27 is affixed to the grease connection on the bearing, not shown, and the valve 25 operated to permit steam to pass thereby interiorly blowing the joint or bearing clean of all hardened, caked grease and grit and thoroughly cleansing the interior of bearing and warming the same. Thereafter the steam is shut off by valve 25 and this connection removed and the greasing connection 20 is applied to the bearing fitting, and the valve 33 is backed off to open the port 35 and the steam valve 39, Fig. 1, previously opened, permits steam to pass by piston 9, through the pipe 15, to the top of the piston 9 whereupon the steam forces the piston 9 downwardly against the grease within the piston chamber 8, cuts off the duct 5 as it passes downwardly, and forces the said grease through the ducts 16, 17 and through port 35 to the connector 20 and into the bearing. Said duct 5 is controlled by a check valve 40. When sufficient grease has been introduced into the bearing, the needle valve 35 is closed, shutting off the grease supply, and the next joint is treated as above described, until all of the grease has been extruded from the cylinder 8 after which the pressure is relieved by closing the valve 39 and opening the relief valve 41, Fig. 1, permitting the contained steam to vent to atmosphere and for permitting retraction or return of the piston 9 under the influence of the spring 10, after which the valve 40 opens due to relief of pressure the piston cylinder 8 is then refilled with molten grease, after which the system is again put in operation as often as required.

Having thus described my invention, what I claim is:

1. In a greasing apparatus of the class described, a grease container, a heating coil therein, means for applying heat to said coil to soften the grease contents of said container, a grease holding cylinder in connection with said container, a steam actuated piston means in said cylinder for expelling the grease therefrom, a grease conducting duct leading from said grease containing cylinder, said duct being controlled by a valved nozzle for opening and closing said nozzle to permit or stop expulsion of grease therefrom, and communicating heating jackets surrounding said grease containing cylinder, said grease conducting duct and said greasing nozzle.

2. In combination, a container for holding a supply of grease; a piston in said container; flexible connections having means for attachment to a grease nipple; a grease conductor extending between the said container and one of said flexible connections, means for directing steam under pressure onto the said piston, thence around and throughout the length and under the bottom of said container and thence around throughout the length of said grease conductor to the other of said flexible connections for the purpose set forth.

3. In combination, a container for holding a supply of grease; a piston in said container; flexible connections having means for attachment to a grease nipple; a grease conductor extending between the said container and one of said flexible connections, means for directing steam under pressure onto the said piston, thence around and throughout the length and under the bottom of said container and thence around throughout the length of said grease conductor to the other of said flexible connections for the purpose set forth, means for controlling the movements of the steam and grease, means for venting the container, and automatic means for restoring the piston to the normal position.

4. In combination, a grease container, a heating coil therein, a cylinder having a heating chamber extending therearound; said chamber having an axial extension; a guide in said extension; valved means for filling said cylinder from said container, a piston yieldingly supported at the top of said cylinder, a rod extending from said piston into said extension and through said guide to maintain said piston level in said cylinder; a flexible connection having means for attachment to an interlocking grease nipple, a grease conductor extending from said cylinder to said flexible connection; means for directing a heating fluid from the heating chamber of said cylinder around and throughout the length of said grease conductor, and means for venting said cylinder and means for controlling the flow of grease and heating fluid respectively to said nipple.

5. In apparatus for cleaning and greasing mechanical parts comprising in combination grease supply means; a grease container and a conduit for conducting grease from the container to a mechanical part; means for supplying a continuous flow of heat around said container and around said conduit throughout its length to maintain the grease at the proper consistency; and connections for selectively applying heat or grease to said parts.

6. In apparatus for cleaning and greasing bearings comprising in combination with a grease container, a grease conduit leading from said container; heating means surrounding said container and conduit to maintain the grease at a proper consistency and pressure; and connections and selective means whereby said bearings may be subjected to the pressure of heating fluid to clean the same and to a subsequent pressure application of grease.

7. In a greasing apparatus, a chamber, a jacket for said chamber and providing an interposed space, a hollow extension on said jacket, a piston having a head disposed in said chamber, and a pipe mounted on said extension, said chamber being open at its rear end to receive steam from the jacket whereby to supply steam to the chamber for urging said piston to eject grease from said chamber, part of the steam being movable through said space to maintain the grease in liquid condition.

8. In a lubricating apparatus comprising a grease containing chamber and having a jacket, there being a space between said chamber and said jacket, a grease delivery duct for said chamber, a hollow extension on said jacket, a piston having a head disposed in said chamber, said chamber being open at its rear end to receive steam from the jacket space, a guide-stem carried by said head and loosely disposed in said extension, a steam pipe mounted on said extension and communicating with the latter whereby to supply power to said piston for moving the same in one direction to urge grease through said duct, part of the steam being movable through said space to heat said chamber for maintaining the grease in liquid condition, and spring means disposed within said chamber for moving said piston in the opposite direction.

9. In an apparatus according to claim 8, the elements therein claimed, together with a valve on the steam pipe for shutting off the steam subsequent to movement of said piston in the first mentioned direction.

10. In an apparatus according to claim 8, the elements therein claimed, together with a valve on the steam pipe for shutting off the steam subsequent to movement of said piston in the first mentioned direction, and a relief valve for said chamber to facilitate movement of said piston in the second mentioned direction.

11. In an apparatus according to claim 8, the elements therein claimed, together with a pipe for supplying grease to said chamber.

12. In an apparatus according to claim 8, the elements therein claimed together with a pipe for supplying grease to said chamber through said jacket, and a check valve for said latter pipe.

13. In a device of the kind described, a steam jacketed and piston provided cylinder, a steam jacketed nozzle, and a steam jacketed conduit connecting the cylinder and nozzle, said cylinder having communication with its jacket whereby steam from the jacket acts on the piston to force the same forwardly, the communication between the cylinder and jacket being behind the piston.

14. In combination, means for holding melted grease including an exit duct; an outer piping around said duct; a tubular nozzle head having a discharge port; a valve to close said port and having a handle; said head communicating with said exit duct; a passage from said outer piping surrounding said exit duct and said head, and having a branch duct near said head; and flexible connections from said port and branch duct respectively.

15. In combination, means for holding grease including an exit duct; a pressure steam passage means comprising an outer piping surrounding said exit duct, a tubular nozzle head having a stuffing box at one end, said box having cooperating exterior and interior threads, and a valve seat port at the other end; a valve needle in said stuffing box and engageable with said seat and having an exterior handle and a threaded portion engaged with said threads; a flexible extension on said head at said port and having an attachment at its free end for connection with a part to be lubricated; said head laterally communicating with said exit duct between said seat and thread, whereby valve-controlled grease may flow out through said extension; a steam extension passage from said outer piping surrounding said exit duct, and said head at said valve needle and having a valved branch duct near said port; a flexible connection forming an extension of said branch duct and provided with a connector for connecting with a grease nipple.

16. In combination, a melted grease supply chamber, a tubular nozzle head having a stuffing box at one end, intermediate interior threads, and a valve seat port at the other end; a valve needle in said stuffing box and engageable with said seat and having an exterior handle and an exterior threaded portion engaged with said first threads; a flexible extension on said head at said port and having an attachment at its free end for connection with a part to be lubricated; said head having a lateral inlet duct between said seat and the first threads for communication with the melted grease supply whereby valve-controlled grease may flow out through said extension; a pressure steam supply pipe; a steam supply means having an extension passage surrounding said inlet duct and said head at said valve needle and having a valved branch duct near said port; a flexible connection forming an extension of said branch duct and provided with a connector for connecting with a grease nipple, whereby controlled pressure steam may heat said chamber, duct and nozzle and the grease therein and be simultaneously forced into a joint or bearing to melt and force out caked grease therein and to clean and heat the same for the reception of valve controlled grease passing out through said duct, head and attachment while being heated by said steam.

17. In combination, a piston chamber having an open end; a casing surrounding and spaced from said open end to form a jacket at said end; a piston in said chamber; an inlet duct to the interior of the chamber; an exit duct from said chamber; means supplying pressure steam to the interior of said jacket; a tubular nozzle head having a discharge port and communicating with said exit duct.

18. In combination, a piston chamber having an open end; a casing surrounding and spaced from said chamber at sides and ends to form a jacket; a piston in said chamber; an exit duct from the interior of the chamber; and pressure steam passage means communicating with said chamber for heating grease therein and applying steam pressure to the piston.

19. In combination, a piston chamber having an open end; a piston in said chamber having a piston stem; a tubular member wherein said stem is freely movable; an exit duct leading from the interior of the chamber; and a pressure steam jacket extending from said member and surrounding and spaced from said chamber for heating grease in the chamber and applying steam pressure to the piston; and guide means in said member for said stem.

20. In combination, a piston chamber having an open end and a closed end; a casing surrounding, and spaced from, said chamber on all sides thereof to form a steam jacket, and provided with a tubular extension coaxial with the chamber and having a rigid inner stem guide partly spaced from the walls of the extension; a piston in said chamber having a piston stem guided in said guide; a spring compressed between the piston and said closed end to hold the piston retracted; an inlet duct for melted hard grease extending through said jacket to the interior of the piston chamber and having a check valve therein; an exit duct extending from said chamber through the jacket; and a valved pipe communicating with the outer end of said extension, whereby controlled pressure steam may fill said jacket and press upon the piston; whereby grease may be pressed from the chamber through the exit duct, and pressure steam may surround and heat said chamber.

21. An apparatus for delivering a lubricant to bearings comprising in combination a grease container including a cylinder having an open end, a nozzle communicating with the other end of said cylinder; a piston mounted in said cylinder at said end; means enclosing said container and providing around the latter a space, means mounted on said enclosing means and communicating with said space for delivering steam under pressure thereto, whereby to move said piston to the second mentioned end for urging grease through said nozzle, said steam adapted also to melt the grease, and spring means for returning said piston.

22. An apparatus for delivering a lubricant to bearings comprising in combination a grease container including a cylinder having an open end, a nozzle communicating with the other end of said cylinder; a piston mounted in said cylinder at said end; means enclosing said container and providing around the latter a space, means mounted on said inclosing means and communicating with said space for delivering steam under pressure thereto whereby to move said piston to the second mentioned end for urging grease through said nozzle, said steam adapted also to melt the grease, manipulable control means for said nozzle, and spring means for returning said piston to the first mentioned end.

23. An apparatus according to claim 22, in which said inclosing means is provided with a steam release duct, and manipulable control means for said duct.

24. The combination of an apparatus which includes a container having an inwardly movable end, a nozzle, hollow conductors connecting said container and said nozzle, for holding hard grease; means including a steam container, which surrounds the first container in spaced relation, whereby to melt the grease, a casing surrounding said conductors and said nozzle in spaced relation and connecting with said steam container; means including the first mentioned means for moving said end inwardly to deliver the melted grease through the nozzle; and means for cleaning the bearings; said latter means also including the first mentioned means, there being a duct on the second mentioned container for delivering steam to perform the cleaning operation.

25. An apparatus for treating used bearings comprising in combination a container for holding hard grease, means for passing steam under pressure along and around said container to maintain the grease heated, means including the first mentioned means for forcing the steam through the bearings, whereby to warm said bearings and clean old grease therefrom; and means for causing the steam to force the melted grease into the cleaned bearings; the first mentioned grease being adapted to harden on said bearings, so that it may be automatically supplied to said bearings during subsequent use thereof.

JOHN E. SHEPHERD.